US006905155B1

(12) United States Patent
Presley et al.

(10) Patent No.: US 6,905,155 B1
(45) Date of Patent: Jun. 14, 2005

(54) MULTIPLE HEIGHT LOAD FLOOR SYSTEM

(75) Inventors: William T Presley, Macomb Township, MI (US); Paulius Butkunas, Livonia, MI (US); David H Walter, Rochester Hills, MI (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 19 days.

(21) Appl. No.: 10/766,056

(22) Filed: Jan. 28, 2004

(51) Int. Cl.[7] .............................................. B62D 43/06
(52) U.S. Cl. ..................................... 296/37.2; 296/57.3
(58) Field of Search ............................... 296/37.2, 37.3, 296/37.14, 37.16; 297/378.12, 15, 378.1; 224/42.12, 42.21; 414/426, 463, 465, 466, 414/471, 495

(56) References Cited

U.S. PATENT DOCUMENTS

| 4,768,827 | A | | 9/1988 | Musgrove |
| 5,061,002 | A | * | 10/1991 | Saso ......................... 296/37.3 |
| 5,178,434 | A | * | 1/1993 | Krebs ........................ 296/37.3 |
| 5,257,846 | A | * | 11/1993 | Kanai et al. ............. 296/37.14 |
| 5,836,637 | A | * | 11/1998 | Laginess et al. ............... 296/75 |
| 6,106,046 | A | * | 8/2000 | Reichel ........................ 297/15 |
| 6,135,555 | A | * | 10/2000 | Liu et al. ..................... 297/336 |
| 6,247,741 | B1 | * | 6/2001 | Seel et al. ................ 296/37.14 |
| 6,290,277 | B1 | * | 9/2001 | Spykerman et al. ...... 296/24.43 |
| 6,439,633 | B2 | * | 8/2002 | Nemoto .................... 296/37.14 |
| 6,467,829 | B2 | * | 10/2002 | Kaluszka et al. ........... 296/37.3 |
| 6,499,787 | B2 | * | 12/2002 | Jach et al. ................ 296/65.09 |
| 6,505,874 | B2 | * | 1/2003 | Ando et al. ............... 296/37.16 |
| 6,520,581 | B1 | * | 2/2003 | Tame .......................... 297/336 |
| 2003/0006637 | A1 | * | 1/2003 | Jach et al. .................. 297/336 |

FOREIGN PATENT DOCUMENTS

JP            361249950 A  * 11/1986   ............... 296 37.16

* cited by examiner

Primary Examiner—H. Gutman
(74) Attorney, Agent, or Firm—Ralph E. Smith

(57) ABSTRACT

In a motor vehicle having a cargo area over an in-floor recess for storing a spare wheel and tire, a multiple height load floor system for covering the in-floor recess provides the option of selecting the depth of the recess. The floor system is adapted to allot a lesser volume to the in-floor recess for use with an undersized spare, or a greater volume when a full-size spare is provided. In a motor vehicle with folding seats, the folding seats are selectively raised or lowered to align with the upper surface of the load floor system in its selected position, in order to present a substantially flat surface for carrying cargo. The selective raising or lowering of the seats and the floor system can be achieved through manually actuated or electrically powered mechanisms.

6 Claims, 3 Drawing Sheets

MULTIPLE HEIGHT LOAD FLOOR SYSTEM

CROSS-REFERENCE TO RELATED APPLICATIONS

Not applicable.

STATEMENT REGARDING FEDERALLY SPONSORED RESEARCH

Not applicable.

BACKGROUND OF THE INVENTION

1. Field of the Invention

The invention relates to a system for adjusting a load floor height in an automobile. The invention further relates to adjusting the volume of a spare tire or cargo recess to receive a full-size spare.

2. Description of Related Art

The user of today's multi-use vehicles expects a great deal of flexibility in the configuration of vehicle interior space. One common component of that interior space is the volume set aside for the storage of a spare tire for the vehicle. While some vehicles are equipped with a spare tire that matches the tires installed on the vehicle for full time operation, it is increasingly common for the provided spare tire to be of a more compact size, commonly known as a "donut."

The donut spare has the advantage of requiring less storage space. However, some vehicle users will replace the donut spare with a full-size spare, and will expect that the full-size spare will fit in the provided recess. Automakers therefore must make the recess of sufficient size and depth to receive the full-size spare. The vehicle user that is content with the donut spare therefore also loses the cargo volume set aside for the full-size spare.

It would be advantageous to provide a system configuration providing the vehicle user with the maximum cargo space available, recapturing the space previously allotted to the full-size spare for those vehicles not carrying the full-size spare. The system should be adaptable for the user desiring to carry a full-size spare. It would further be advantageous to provide such a system that provides either user with a useable flat load floor in either configuration.

BRIEF SUMMARY OF THE INVENTION

In a motor vehicle having an in-floor recess, the invention includes a multiple height load floor system comprises a folding seat assembly adjacent the in-floor recess and adapted for folding to a load floor configuration at two elevations relative to a vehicle datum, and a load platform configured for covering the in-floor recess and being supported over the in-floor recess at the two elevations, whereby the folding seat assembly and the load platform adjoin to form a substantially continuous load floor.

In a further embodiment, in a motor vehicle having a cargo area over an in-floor recess for storing a spare wheel and tire, a multiple height load floor system for covering the in-floor recess provides one of two depths for the recess, the floor system being adapted to allot a lesser volume to the in-floor recess for use with an undersized spare, or a greater volume for a full-size spare, and a folding seat adapted to be selectively raised or lowered to align with the upper surface of the load floor system, whereby the seat and load floor present a substantially flat surface for carrying cargo.

BRIEF DESCRIPTION OF THE SEVERAL VIEWS OF THE DRAWINGS

The present invention will become more fully understood from the detailed description and the accompanying drawings, wherein.

DETAILED DESCRIPTION OF THE INVENTION

Figure 1:
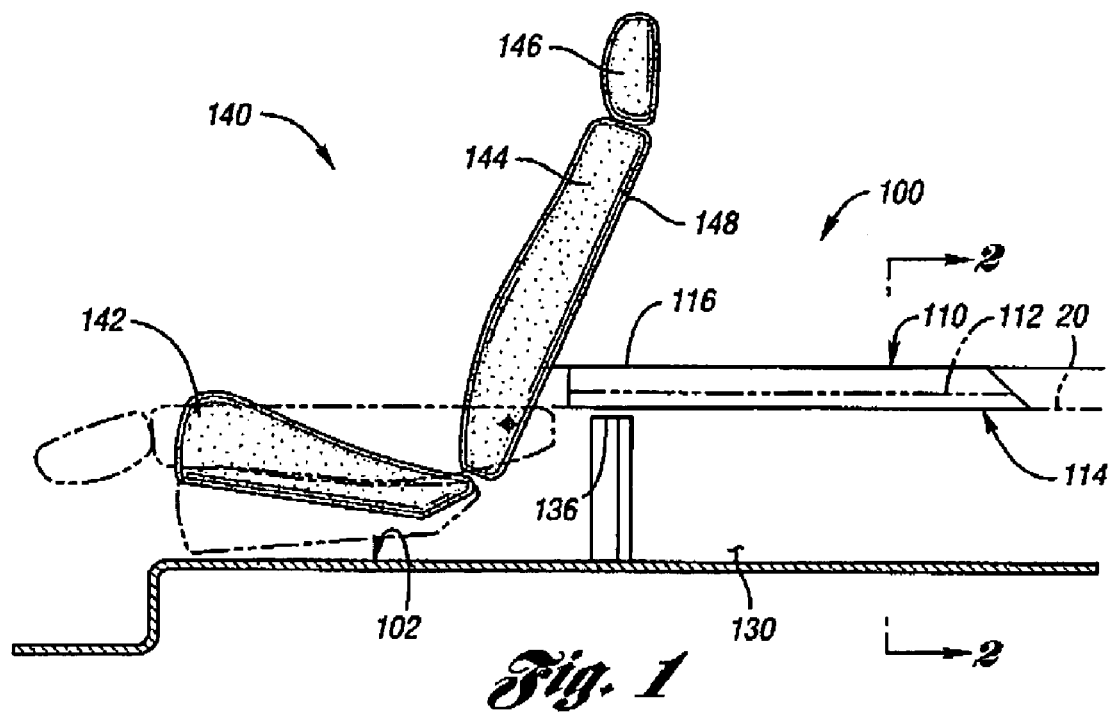
FIG. 1 is a side view of a multiple height load floor system according to the invention.

Referring to FIG. 1, a multiple height load floor system 100 according to the invention includes a reversible load platform 110 and a folding seat assembly 140. The platform 110 forms a cover over a rear cargo recess 130 generally configured to store a spare wheel and tire 132, 134 (hereinafter referred to in the common parlance as the "donut spare" 132 or the "full-size spare" 134). The seat assembly 140 and platform 110 are configured to form a load surface at one of multiple elevations relative to a vehicle datum 20 such as vehicle floor 102.

The seat assembly 140 includes a seat base 142 secured to vehicle floor 102 by a mechanical or electromechanical mounting system (not shown) that provides a range of vertical adjustment. A seat back 144 with headrest 146 is pivotally mounted to the seat base 142. The seat back 144 is pivotable from a generally upright position for supporting a seat occupant to a generally horizontal position (shown in phantom) wherein the back surface 148 of seat back 144 presents a load surface for holding cargo.

In the configuration shown in phantom in FIG. 1, the load floor system 100 is shown in a lower position 112 configured for storage of a donut spare in recess 130. Seat assembly 140 is moved to a lower position so that the back surface 148 of seat back 144 aligns vertically with the exposed low floor surface 112 of reversible load platform 110.

Figure 2:
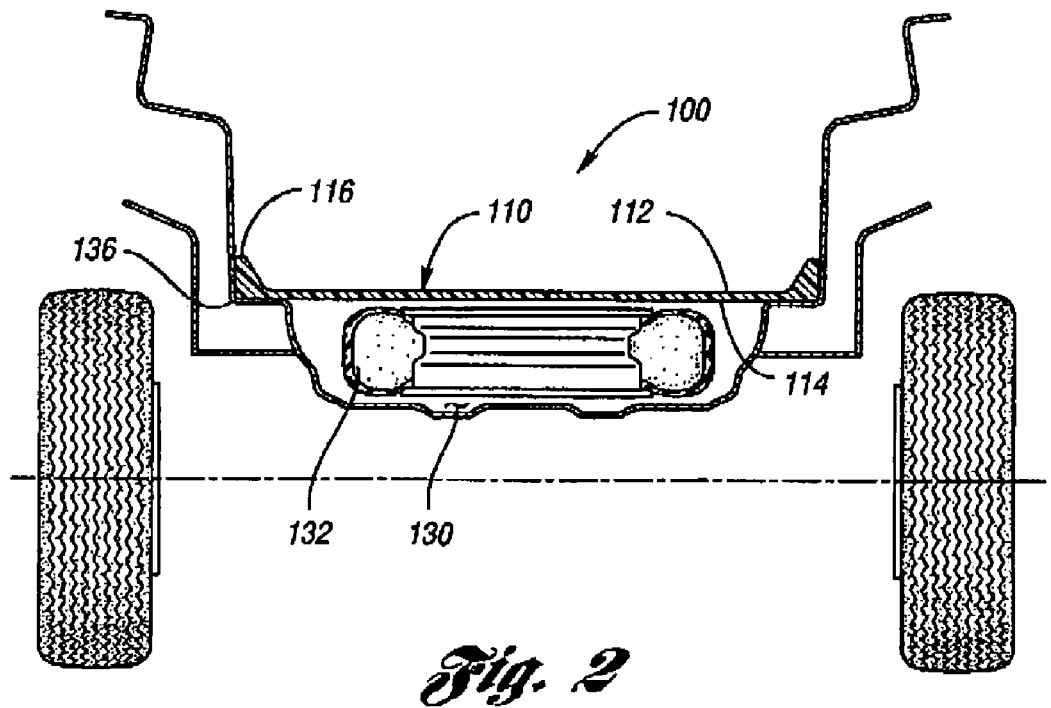
FIG. 2 is a cross-sectional view taken through line 2—2 of FIG. 1.

Referring to FIG. 2, reversible load platform 110 is generally U-shaped. In the low floor configuration of FIG. 2, the low floor surface 112 is exposed and available for receiving cargo. A pair of load platform support legs 116 extend upwardly along either edge of load platform 110. High floor surface 114 is directed downwardly toward recess 130, which contains donut spare 132. The load platform 110 rests on sill 136 surrounding recess 130.

Figure 3:
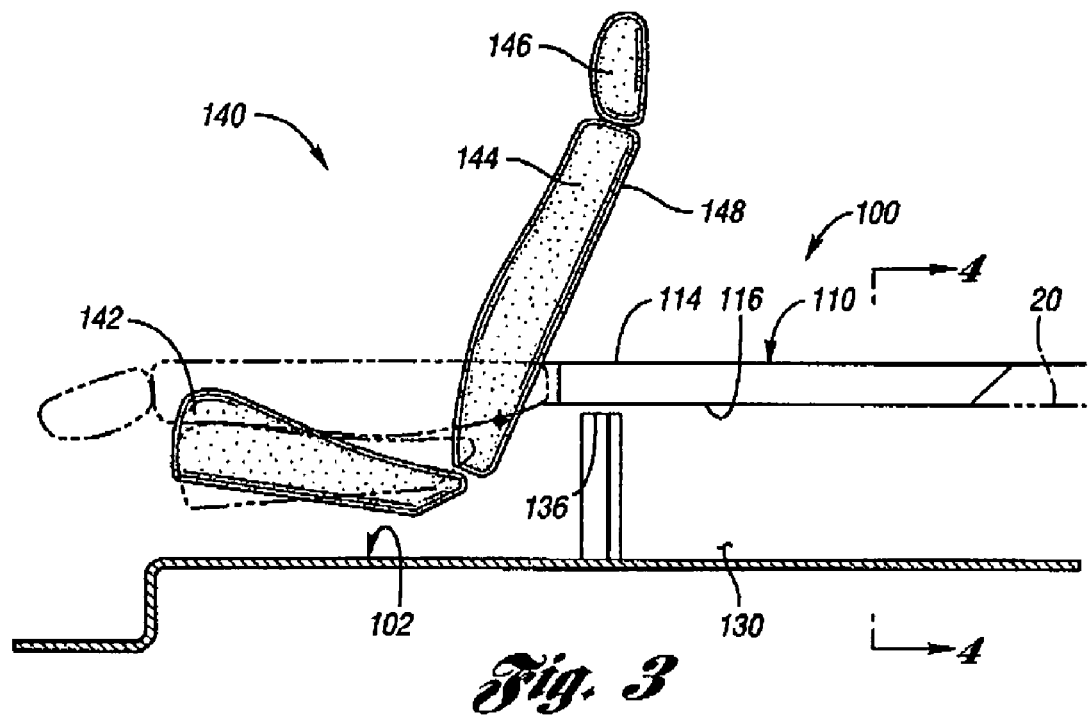
FIG. 3 is a side view of the multiple height load floor system of FIGS. 1–2 in a raised floor height configuration.
Figure 4:
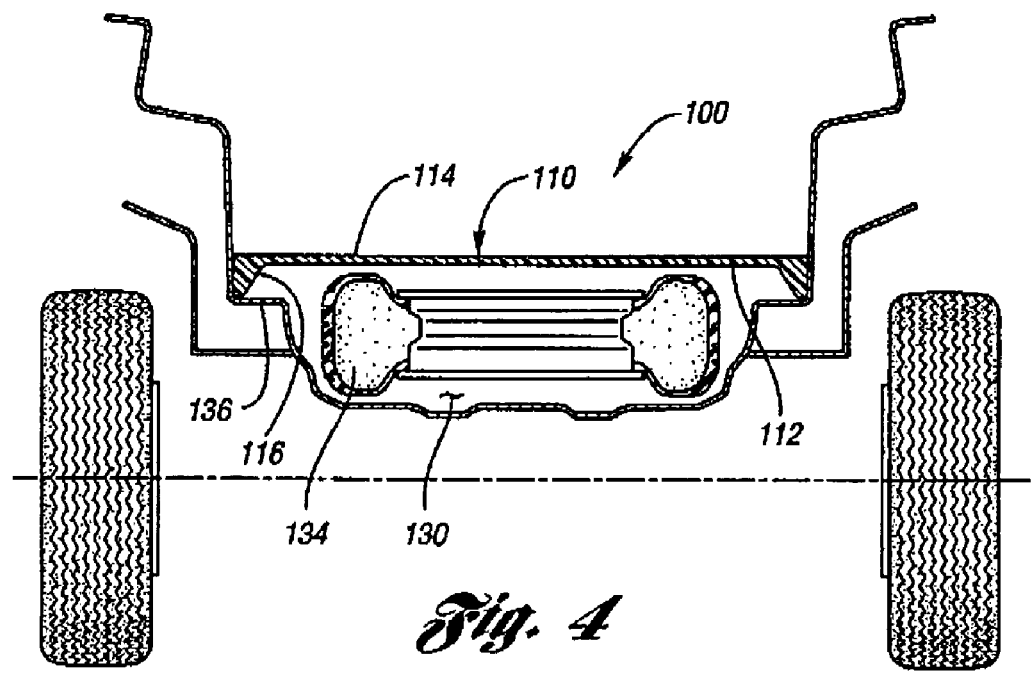
FIG. 4 is a cross-sectional view taken through line 4—4 of FIG. 3.

Referring now to FIG. 3, seat assembly 140 is folded (in phantom) with back surface 148 of seat back 144 resting at a higher elevation for aligning with high floor surface 114 of load platform 110. As shown in FIG. 4, load platform 110 has been inverted so that high load floor 114 is upward for receiving a load. Load platform 110 is supported by support legs 116 resting on sill 136. As a result, low floor surface 112 is directed toward recess 130 at an elevation raised above sill 136, providing a greater height for recess 130, adapting it to receive the deeper full-size spare 134.

Figure 5:
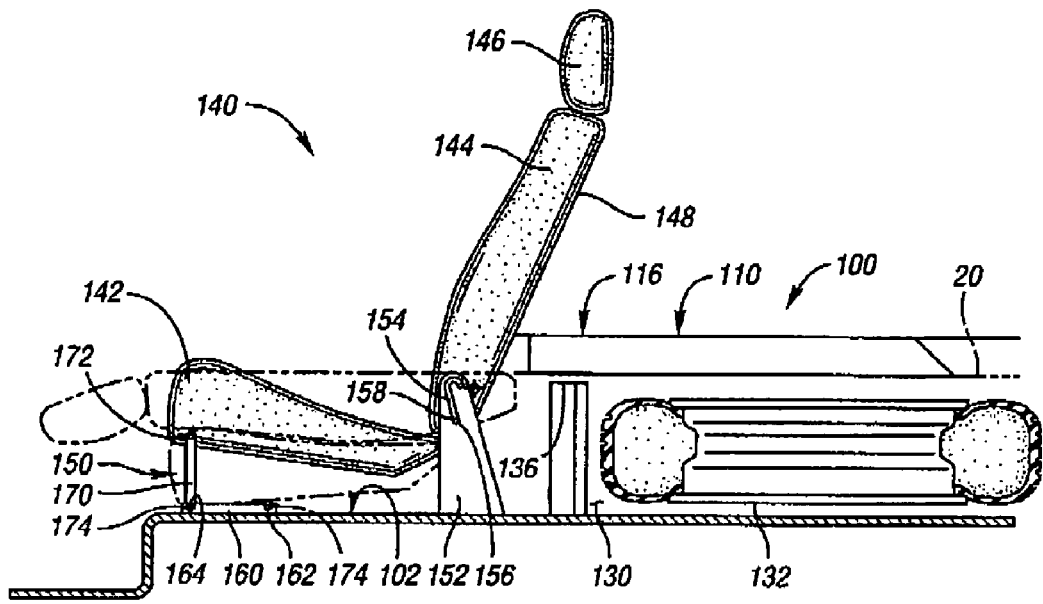
FIG. 5 is a side view of a further embodiment of a multiple height load floor system according to the invention.
Figure 6:
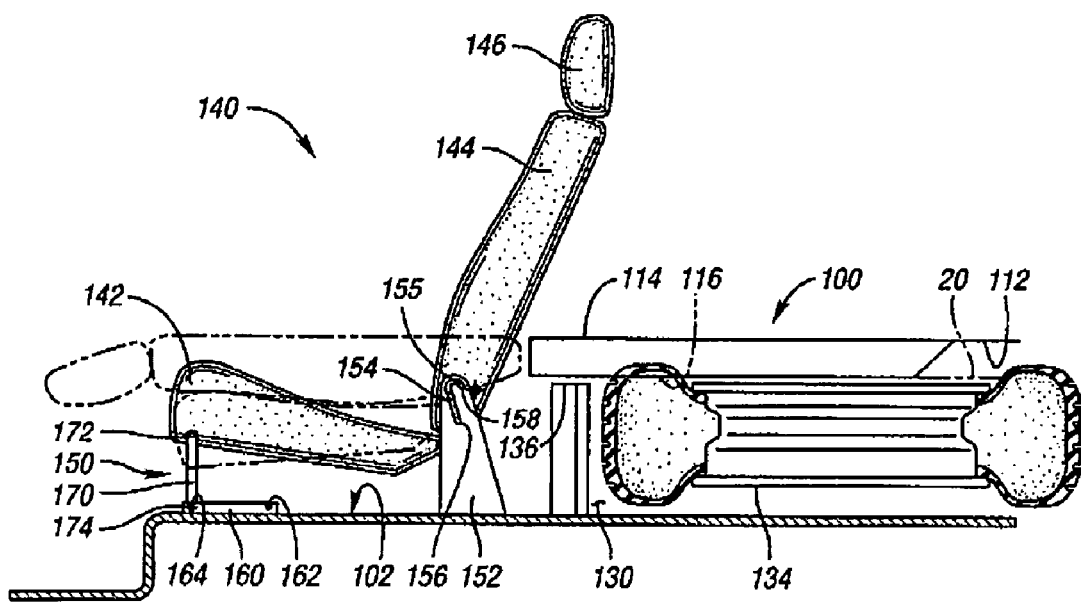
FIG. 6 is a side view of the multiple height load floor system of FIG. 5 in a raised floor height configuration.

An exemplary configuration of an adjustable seat support mechanism 150 is shown in FIGS. 5–6. The seat back 144 is shown in phantom in the folded position over seat base 142. Seat base 142 is connected to support mechanism 150 at a rear support bracket 152 and a front support bracket 160. Seat base 142 comprises a rear support pin 158 riding in a J-shaped adjustment slot 154. The seat base 142 is pivotally mounted to a front support leg 170 at pivot 172. The support leg 170 includes a front support pin 174 for selectively engaging a front support bracket 160 in rearward and forward pin-receiving slots 162, 164.

In the lower configuration shown in phantom in FIG. 5, front support pin 174 is lodged in rearward pin-receiving slot 162 lowering the first support lea as rear support pin 158 is moved to lower portion 156 of slot 154. In this lower configuration, back surface 148 of seat back 144 aligns with low floor surface 112.

Referring to FIG. 6, front support pin 174 is moved to forward pin-receiving slot 164, moving front support leg 170 to a raised position. Rear support pin 158 is moved to upper portion 155 of slot 154. Seat base 142 is thereby raised so that back surface 148 of seat back 144 aligns with high floor surface 114 of load platform 110 (now inverted from its position of FIG. 5).

While the invention has been described in the specification and illustrated in the drawings with reference to a preferred embodiment, it will be understood by those skilled in the art that various changes may be made and equivalents may be substituted for elements thereof without departing from the scope of the invention as defined in the claims. In addition, many modifications may be made to adapt a particular situation or material to the teachings of the invention without departing from the essential scope thereof. Therefore, it is intended that the invention not be limited to the particular embodiment illustrated by the drawings and described in the specification as the best mode presently contemplated for carrying out this invention, but that the invention will include any embodiments falling within the scope of the appended claims.

What is claimed is:

1. A multiple height load floor system for a vehicle comprising:
    a recess in a floor of the vehicle having a substantially horizontal sill extending along at least opposing sides of the recess;
    an invertible load platform configured for covering the floor recess when disposed upon the sill, the load platform having a first substantially planar surface on one side thereof and a second surface having integral raised support legs extending from opposite edges thereof, the load platform defining a first load floor elevation when the first surface is placed on the sill and defining a second load floor elevation higher than the first load floor elevation when the load platform is inverted to place the support legs on the sill.

2. The multiple height load floor system of claim 1, further comprising:
    a folding seat assembly including a seat back and a seat cushion adjacent the recess and adapted for folding the seat back over the seat cushion such that a rear surface of the seat back is selectively placed at one of the first and second load floor elevations to form a substantially continuous surface with the load platform.

3. The multiple load floor system of claim 1 wherein the recess is sized for storing an undersized spare tire and wheel when the load platform defines the first load floor elevation, and for storing a full sized spare tire and wheel when the load platform defines the second floor elevation.

4. The multiple load floor system of claim 2 wherein the recess is sized for storing an undersized spare tire and wheel when the load platform defines the first load floor elevation, and for storing a full sized spare fire and wheel when the load platform defines the second load floor elevation.

5. The multiple load floor system of claim 2 further comprising:
    a front support leg coupled at one end thereof to the seat cushion and having a second end movable to first and second positions on the vehicle floor;
    an adjustment slot at a side surface of the seat back;
    a rear support bracket having a first end coupled to the vehicle floor and a second end having a pin engaging the adjustment slot;
    the seat back folding to the first load floor elevation when the second end of the front support leg is placed at the first position and the rear support bracket pin is placed at a first end of the adjustment slot; and
    the seat back folding to the second load floor elevation when the second end of the front support leg is placed at the second position and the rear support bracket pin is placed at a second end of the adjustment slot.

6. The multiple height load floor system of claim 5 wherein the adjustment slot is substantially J-shaped.

* * * * *